Nov. 15, 1960  A. H. BARKE  2,960,560
BATTERY TERMINAL PROTECTORS
Filed Sept. 23, 1957

INVENTOR.
ALBERT H. BARKE
BY *Moore, White & Beard*

ATTORNEYS

United States Patent Office 2,960,560
Patented Nov. 15, 1960

2,960,560
BATTERY TERMINAL PROTECTORS
Albert H. Barke, 1449 Eleanor Ave., St. Paul, Minn., assignor of one-half to David Rosen, Minneapolis, Minn.

Filed Sept. 23, 1957, Ser. No. 685,456
4 Claims. (Cl. 136—181)

This invention relates to new and useful improvements in protective devices for the terminals of storage batteries, and particularly to a device for preventing corrosion of the usual battery cables and terminal connectors or clamps by the electrolyte of the battery, which may at times seep past the terminal posts and contact the exteriors of the posts and cable clamps, causing said parts to corrode, sometimes to the extent that it may be extremely difficult to loosen the nut on the cable clamp to free the clamp from the terminal post, as when the battery is to be removed for recharging.

Numerous attempts have heretofore been made to provide devices for thus protecting the cables and cable clamps from the corrosive action of acid which may leak from the battery, but to the best of my knowledge, none of these have proven entirely satisfactory and hence few are in commercial use.

The novel battery terminal protector herein disclosed is the result of long and costly experimental work in attempt to develop such a device in which all of the objectionable features heretofore inherent in such devices have been entirely eliminated, and which is so constructed that it may readily and quickly be applied to a conventional battery terminal without the use of tools or special equipment.

An important object of the present invention is to provide a battery terminal protector comprising a disk-like body having a central aperture therein for receiving the terminal post, said central aperture being defined by an annular depending flange of substantial width in an axial direction thereby to provide an enlarged surface for frictionally engaging the periphery of the terminal post with sufficient snugness to inseparaby secure the device thereto, and to prevent the passage of acid between the wall of said central aperture and the periphery of the terminal post into contact with the cable clamp secured to the upper end of the terminal post.

A further object of the invention is to provide a battery terminal protector comprising a circular flexible disk-like body which is normally substantially flat, said body having an enlarged central aperture therein defined by an annular depending flange adapted to frictionally engage the terminal post when said disk-like body is fitted onto the terminal post.

A further object is to provide a device of the class described comprising a flat circular flexible body having means for frictionally securing it to a battery terminal post, the unique construction of said device being such that when pressed firmly into position on a terminal post, said body will assume a conical shape, whereby any acid or other liquid engaging the top or bottom surfaces thereof will drain therefrom to the outer marginal edge of the device and discharge therefrom.

A further object is to provide an anticorrosive device for storage battery terminals which readily lends itself to mass production, whereby it may be manufactured at extremely low cost so that it may be sold to the trade at a very nominal price.

A further object is to provide a device of the class described comprising a one-piece flat body made from an acid and moisture proof flexible material such as polyethylene, whereby it is substantially indestructible.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figure 1:
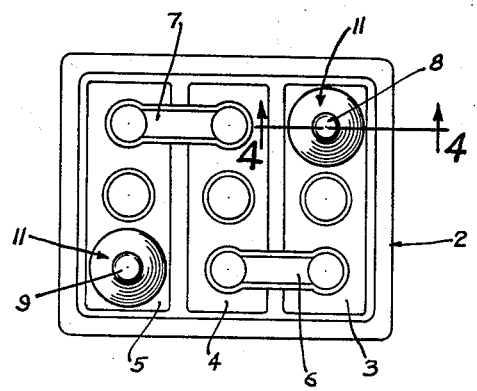
Figure 1 is a top view of a conventional storage battery showing the invention applied to the terminal posts thereof.

In the selected embodiment of the invention herein disclosed there is illustrated in Figure 1, for purposes of disclosure, the top view of a conventional storage battery comprising the usual case 2, cells 3, 4 and 5, electrically connected together by connectors 6 and 7. The usual negative and positive tapered terminal posts 8 and 9, respectively, are also shown to which the usual cable clamps (not shown) may be secured in the usual manner.

Figure 2:
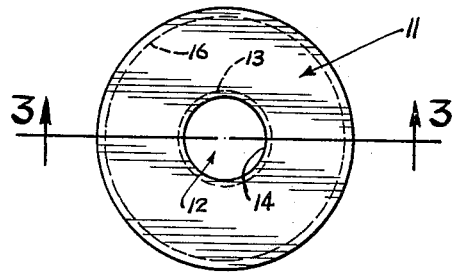
Figure 2 is a plan or top view of one of my battery terminal devices removed from the terminal post.
Figure 3:
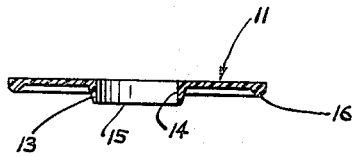
Figure 3 is a sectional view on the line 3—3 of Figure 2, showing the device in its normal flat state.
Figure 4:
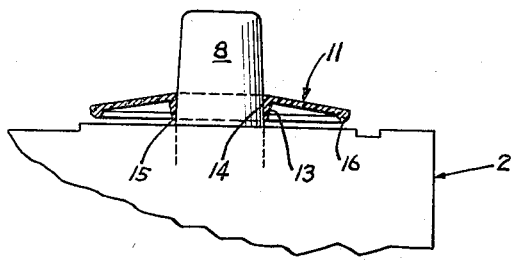
Figure 4 is a detail sectional view on the line 4—4 of Figure 1, showing the disk-shaped form of the disk-like body when pressed into fixed position on a battery terminal post.

The novel terminal protector herein disclosed is shown comprising a flat disk-like body, generally designated by the numeral 11, which normally is flat, as illustrated in Figure 3. The body 11 is preferably circular in configuration, as shown in Figure 2, but not necessarily so. It has an axial bore 12 therein defined by an annular flange 13 which extends downwardly from the body 11 to a substantial distance, as indicated in Figures 3 and 4, thereby to provide an enlarged annular cylindrical wall surface 14 adapted to be pressed into frictional engagement with the periphery of the tapered terminal post 8, as will be understood by reference to Figure 4.

The annular surface 14 defining the bore 12 is cylindrical when the protector is in its normal free state, as illustrated in Figure 3. It will also be noted by reference to Figure 3 that the outer wall surface of the annular flange 13 tapers inwardly in a downward direction so that its bottom edge 15 is substantially knife-edged for reasons subsequently to be described. The outer marginal edge portion of the disk-like body 11 is provided on its underside with a depending peripheral bead 16 which serves a dual function. It provides a reinforcement for the outer marginal edge of the body 11, and it also provides a drip bead for guiding any acid or other liquid which may reach the top or bottom surfaces of the body 11, away from the terminal post, as will be understood by reference to Figure 4.

Polyethylene has been found a highly desirable material from which to make the novel battery terminal protector herein disclosed. This material is acid and moisture proof, has a high degree of resiliency, is highly resistant to wear and shocks, and readily lends itself to pressure molding, well known in the art, whereby the protective device herein disclosed may be manufactured in mass production at extremely low cost, as will readily be understood by reference to Figures 2 and 3.

To apply the battery protectors to the tapered terminal posts of a battery, the protectors are fitted over their respective terminal posts and firmly pressed downwardly thereon, usually with the fingers, until the cylindrical wall surfaces 14 of the bores 12 are brought into conformity with the tapered peripheries of the terminal posts. When the protectors 11 are so seated on their respective terminal posts, the wall surfaces 14 thereof will frictionally engage the peripheries of the terminal posts with sufficient grip to prevent accidental separation of the protectors 11 from the terminal posts. As each disk is pressed downwardly into snug engagement with the periphery of its terminal post, the tension developed in the body of the protectors causes it to assume an inverted dish-like shape as shown in Figure 4, whereby any moisture or acid deposited thereon will readily drain to the outer edge of the device and drip onto the top of the battery, as will be understood.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

I claim as my invention:

1. A battery terminal protector comprising; a flat resilient body having a central bore therein, a resilient flange formed around the central bore of said body, said body being substantially flat when free from tension, the central bore of said body being smaller in diameter than a tapered battery terminal post, whereby when said body bore and flange are distorted into conformity with a tapered battery terminal post, said flange frictionally grips a battery terminal post onto which the protector is pressed to support the protector and said body is distorted into an inverted dish shape with the periphery of said body nearer the top of a battery than are the portions adjacent said flange.

2. The battery terminal protector of claim 1 in which said flange is depending.

3. The battery terminal protector of claim 2 in which a depending bead is formed on the periphery of said body.

4. The battery terminal protector of claim 1 in which a depending flange is formed on the periphery of said body.

References Cited in the file of this patent

UNITED STATES PATENTS

| | | |
|---|---|---|
| 1,364,861 | Bliss | Jan. 11, 1921 |
| 1,680,038 | Dunzweiler | Aug. 7, 1928 |
| 1,999,870 | Douglas | Apr. 30, 1935 |
| 2,013,219 | Peterson | Sept. 3, 1935 |
| 2,148,738 | Feldtkeller | Feb. 28, 1939 |

FOREIGN PATENTS

| | | |
|---|---|---|
| 285,993 | Great Britain | Feb. 27, 1928 |
| 437,946 | Great Britain | Nov. 4, 1935 |